(12) United States Patent
Talmy et al.

(10) Patent No.: US 7,854,912 B1
(45) Date of Patent: Dec. 21, 2010

(54) HIGH STRENGTH ZR (HF OR TI)-TA-B CERAMICS

(75) Inventors: Inna G. Talmy, North Potomac, MD (US); James A. Zaykoski, Mount Airy, MD (US); Adrienne H. Smith, Evanston, IL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 321 days.

(21) Appl. No.: 12/079,065

(22) Filed: Mar. 21, 2008

Related U.S. Application Data

(60) Provisional application No. 60/907,163, filed on Mar. 23, 2007.

(51) Int. Cl.
*C01B 35/00* (2006.01)
*C01B 35/04* (2006.01)
*C01B 25/08* (2006.01)

(52) U.S. Cl. .................. 423/276; 423/297; 423/289; 501/93; 501/87; 501/96.1; 156/89.11

(58) Field of Classification Search .................. None
See application file for complete search history.

(56) References Cited

U.S. PATENT DOCUMENTS 3,305,374 A * 2/1967 Sucharski et al. .......... 501/96.1

FOREIGN PATENT DOCUMENTS

WO WO 8907661 A * 8/1989

OTHER PUBLICATIONS

Levine et al.; Oxidation of ZrB2 and HfB2-based Ultra-High Temperature Ceramics: Effect of Ta additions; Journal of Material Science; 39, 5969-5977; 2004.*

* cited by examiner

*Primary Examiner*—Melvin C Mayes
*Assistant Examiner*—Guinever S Gregorio
(74) *Attorney, Agent, or Firm*—Scott R. Boalick; Richard A. Morgan

(57) ABSTRACT

The crystal structure of three compositions of matter has been determined to be iso-structural with FeB ortho-rhombic (space group Pnma). The crystalline structures are: $Ti_{0.5}Ta_{0.5}B$, $Zr_{0.5}Ta_{0.5}B$ and $Hf_{0.5}Ta_{0.5}B$. A process for preparing ceramics is disclosed. Molded ceramics including the compositions of matter are useful for applications such as rocket nozzles, leading edges on hypersonic missiles, engine parts and other applications requiring a structural component to operate at temperatures of 1600° C. to 2400° C.

15 Claims, No Drawings

HIGH STRENGTH ZR (HF OR TI)-TA-B CERAMICS

CROSS-REFERENCE TO RELATED APPLICATION

This application claims the benefit of application Ser. No. 60/907,163 filed Mar. 23, 2007, for High-Strength Ceramics in the System Zr (or Hf)—Ta—B.

STATEMENT OF GOVERNMENT INTEREST

The invention described herein may be manufactured and used by or for the Government of the United States of America for governmental purposes without the payment of any fee thereon or therefor.

BACKGROUND OF THE INVENTION

1. Field of the Invention

The invention relates to an FeB type orthorhombic (space group Pnma) composition of matter and ceramics therefrom. The invention also relates to a process for making ceramics.

2. Discussion of the Related Art

There is interest in ultra-high temperature ceramics that can be used as structural components at temperatures of 1600° C. to 2400° C. This operating temperature range is found in a number of weapons systems and aerospace applications. These include rocket nozzles, leading edges for hypersonic missiles and hypersonic flight vehicles, gas turbine and reciprocating engine parts, missile launchers, and gun chambers. Any ultra-high temperature ceramic material must be chemically and physically stable at elevated operating temperatures, must have high strength and toughness over the entire operating temperature range and must be creep resistance at elevated temperatures. Ceramic materials based on Group IV-VI transition-metal borides have been considered for use in ultra-high temperature structural applications.

SUMMARY OF THE INVENTION

The invention is an FeB-type orthorhombic (space group Pnma) composition of matter having the general formula:

$$Me_{0.5}Ta_{0.5}B.$$

In the general formula: Me is a metal selected from the group consisting of zirconium, hafnium and titanium; Ta is tantalum and B is boron. The composition of matter is characterized in a melting temperature exceeding 2300° C. The invention is also a ceramic material comprising the FeB-type orthorhombic (space group Pnma) composition of matter. The invention is also a process.

DETAILED DESCRIPTION OF THE INVENTION

The invention is a high-temperature ceramic material. The ceramic material is the reaction product of a refractory diboride and a metal component. The refractory diboride is selected from the group consisting of $TiB_2$, $ZrB_2$ and $HfB_2$. The metal component is Ta. In an alternative, the identical material is formed by reaction of a metal hydride selected from the group consisting of $TiH_2$, $ZrH_2$ and $HfH_2$ with the metal diboride $TaB_2$. In either reaction, the mole ratio is 1:1. In another alternative, the identical material is formed by reaction of a metal selected from the group consisting of Ti, Zr and Hf with Ta and B. In this alternative, the mole ratio is 1:1:2. As a result of these three reactions, three new compositions of matter were discovered: $Ti_{0.5}Ta_{0.5}B$, $Zr_{0.5}Ta_{0.5}B$ and $Hf_{0.5}Ta_{0.5}B$. The microstructure was found to be interlocking bar-like crystals. This microstructure results in a high strength material having a flexural strength of about 500 MPa and a melting temperature above 2300° C. These properties make the materials useful for high-temperature structural applications.

Reaction conditions are the same with any of the forms of the above-mentioned reactants. Powdered reactant pairs are intimately mixed in the presence of a solvent. Acetone was used in the Examples and any other solvents used for this purpose would work as well. The intimately mixed reactants are pressed into a mold of desired shape. The molded material is then fired at about 1600° C. to 2000° C. for about 1 to 3 hours in a non-oxidizing atmosphere such as helium, argon, hydrogen, carbon, vacuum and the like. If ultimate properties, including a fully dense ceramic, are desired, it is necessary to hot press the mixed powders in a graphite mold at a pressure of about 20 MPa, temperature in the range of about 1700° C. to 2000° C. for about 1 to 3 hours.

The crystalline compositions of matter of the invention were discovered in a search for materials having desirable physical properties at high temperature. Crystal lattice parameters are disclosed in Table 1.

TABLE 1

Structural Parameters in $Ti_{0.5}Ta_{0.5}B$, $Zr_{0.5}Ta_{0.5}B$ and 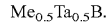$Ta_{0.5}B$ (Space Group Pnma)

| Compound | $Ti_{0.5}Ta_{0.5}B$ | $Zr_{0.5}Ta_{0.5}B$ | $Hf_{0.5}Ta_{0.5}B$ |
|---|---|---|---|
| a, Å | 6.12969(6) | 6.27439(8) | 6.30325(8) |
| b, Å | 3.08700(4) | 3.16370(4) | 3.15748(6) |
| c, Å | 4.63558(7) | 4.78060(7) | 4.79499(6) |
| V, Å$^3$ | 87.716(2) | 94.897(3) | 95.432(2) |

A first sample of $Zr_{0.5}Ta_{0.5}B$ was prepared according to the procedure of Example 1a. The precursor powders were mixed and then fired at 1900° C. in a helium-5% hydrogen atmosphere for 1 hour. The x-ray diffraction pattern of the first sample was recorded. A second sample of $Zr_{0.5}Ta_{0.5}B$ was prepared according to the procedure of Example 1b. The precursor powders were mixed and then hot pressed in a graphite mold at 1800° C. in a helium-carbon atmosphere for 1 hour. The x-ray diffraction pattern of the second sample was recorded. Comparison of the two x-ray diffraction patterns confirmed that both samples were $Zr_{0.5}Ta_{0.5}B$.

The x-ray diffraction patterns of $Zr_{0.5}Ta_{0.5}B$ from Example 1a and Example 1b were compared with the x-ray diffraction pattern of all known metal monoborides. The distribution and intensity of a majority of peaks of $Zr_{0.5}Ta_{0.5}B$ match those of an expanded crystal lattice of FeB which is known to be orthorhombic (space group Pnma). The x-ray diffraction pattern of FeB is recorded as entry 00-032-0463 in the data base Powder Diffraction File (PDF), produced by International Centre for Diffraction Data (ICDD), 12 Campus Blvd., Newtown Square, Pa. 19073-3273. As a result of this structural analysis followed by a literature search, inventors concluded that $Zr_{0.5}Ta_{0.5}B$ is iso-structural with the known orthorhombic (space group Pnma) structure of FeB. The term FeB-type orthorhombic (space group Pnma) structure is well known and is defined herein as containing zigzag chains of boron atoms in which the boron atoms are coordinated by seven iron (that is, metal) atoms in the form of a mono-capped trigonal prism.

The observed, calculated and difference x-ray powder pattern for $Ti_{0.5}Ta_{0.5}B$, $Zr_{0.5}Ta_{0.5}B$ and $Hf_{0.5}Ta_{0.5}B$, respectively were plotted. The difference patterns were plotted on the same scale. The calculated peak positions of various phases were indicated in the plots. Also detected with the $Zr_{0.5}Ta_{0.5}B$ were minor impurity phases including $ZrB_2$, corundum, ZrC, and $ZrO_2$. In the $Hf_{0.5}Ta_{0.5}B$ phase, the sample contained corundum and Hf. There was a trace amount of unidentified phases in the $Ti_{0.5}Ta_{0.5}B$ sample. The presence of the additional corundum phase was due to the grinding process. These excellent refinement results confirmed the FeB as the structural model. Refined structural parameters including lattice parameters and displacement factors were determined. The inter-atomic distances and bond angles were measured.

The orthorhombic (space group Pnma) structure can be envisioned as consisting of trigonal prisms of $(M_{0.5}Ta_{0.5})$ (M=Ti, or Zr, or Hf) with zigzag B chains in the quadrilateral channels between them. A projection was made of $Zr_{0.5}Ta_{0.5}B$ along the b-axis showing trigonal prisms of (Zr, Ta) with boron chains. Zigzag chains of boron running parallel to the b-direction were indicated. From this it was determined that each metal site is surrounded by 10 metal atoms. Each B site is surrounded by seven metal atoms. From this data, the three-dimensional structure of $M_{0.5}Ta_{0.5}B$ (M=Ti, Zr and Hf) showing the connections between M and B was determined.

This invention is shown by way of example.

EXAMPLE

Example 1a

Sample Preparation

The $Ti_{0.5}Ta_{0.5}B$, $Zr_{0.5}Ta_{0.5}B$ and $Hf_{0.5}Ta_{0.5}B$ ceramics were prepared from mixtures of tantalum and the corresponding diborides $TiB_2$, $ZrB_2$, and $HfB_2$ in a mole ratio of 50:50. The powders were used as purchased from Cerac, Inc. They had a reported purity of 99.5% purity and particle size less than 10μ. The powders were carefully mixed in acetone with a corundum mortar and pestle. Mixed powders were pressed into pellets 10 mm in diameters and 3 mm high. The pellets were heated at 1900° C. in He/5% $H_2$ atmosphere for 1 to 2 hours.

The x-ray diffraction pattern of $Ti_{0.5}Ta_{0.5}B$, $Zr_{0.5}Ta_{0.5}B$ and $Hf_{0.5}Ta_{0.5}B$ were plotted.

Example 1b

Sample Preparation

The process of Example 1a was repeated. The powders were hot-pressed in a graphite mold at 1800° C. and 20 MPa under helium atmosphere. The product was determined to be fully dense ceramics.

The x-ray diffraction pattern of $Ti_{0.5}Ta_{0.5}B$, $Zr_{0.5}Ta_{0.5}B$ and $Hf_{0.5}Ta_{0.5}B$ was plotted.

Example 2

X-ray Structural Characterization $Ti_{0.5}Ta_{0.5}B$, $Zr_{0.5}Ta_{0.5}B$ and $Hf_{0.5}Ta_{0.5}B$ were prepared according to Example 1b. Each of the dark grey ceramic bars was ground into fine powder using a corundum mortar and pestle. The powders were mounted in zero-background cells as acetone slurries and allowed to dry. The X-ray powder patterns were measured. The results were consistent.

Example 3

Physical properties of $Zr_{0.5}Ta_{0.5}B$ were measured.
Flexural strength was 515 MPa.
Vickers hardness was 19.70 GPa.
Young Modulus was 429 GPa±42 GPa.
Melting Point was greater than 2300° C.
Physical properties of $Ti_{0.5}Ta_{0.5}B$ were measured.
Flexural strength was 416 MPa.
Vickers hardness was 25.25 GPa.
Young Modulus was 485 GPa±49 GPa.
Melting Point was greater than 2300° C.

The foregoing discussion discloses and describes embodiments of the present invention by way of example. One skilled in the art will readily recognize from this discussion and from the accompanying drawings and claims, that various changes, modifications and variations can be made therein without departing from the spirit and scope of the invention as defined in the following claims.

What is claimed is:

1. An FeB-type orthorhombic crystalline composition of matter consisting of the general formula:

$Me_{0.5}Ta_{0.5}B$, wherein: Me is a metal selected from the group consisting of zirconium, hafnium and titanium; Ta is tantalum and B is boron, and characterized by a melting temperature exceeding 2300° C.

2. The FeB-type orthorhombic crystalline composition of matter of claim 1, consisting of the general formula:

$Zr_{0.5}Ta_{0.5}B$.

3. The FeB-type orthorhombic crystalline composition of matter of claim 1, consisting of the general formula:

$Hf_{0.5}Ta_{0.5}B$.

4. The FeB-type orthorhombic crystalline composition of matter of claim 1, consisting of the general formula:

$Ti_{0.5}Ta_{0.5}B$.

5. Ceramics comprising an FeB-type orthorhombic crystalline composition of matter consisting of the general formula:

$Me_{0.5}Ta_{0.5}B$, wherein: Me is a metal selected from the group consisting of zirconium, hafnium and titanium; Ta is tantalum and B is boron, and characterized by a melting temperature exceeding 2300° C.

6. The ceramics of claim 5, wherein the FeB-type orthorhombic crystalline composition of matter consisting of the general formula:

$Zr_{0.5}Ta_{0.5}B$.

7. The ceramics of claim 5, wherein the FeB-type orthorhombic crystalline composition of matter consisting of the general formula:

$Hf_{0.5}Ta_{0.5}B$.

8. The ceramics of claim 5, wherein the FeB-type orthorhombic crystalline composition of matter consisting of the general formula:

$Ti_{0.5}Ta_{0.5}B$.

9. A process for preparing ceramics comprising a FeB-type orthorhombic crystalline composition of matter consisting of the general formula:

$Me_{0.5}Ta_{0.5}B$, wherein: Me is a metal selected from the group consisting of zirconium, hafnium and titanium; Ta is tantalum and B is boron, comprising:

mixing a stoichiometric amount of powdered reactants Me, Ta, and B and heating in a non-oxidizing atmosphere at a temperature of about 1600 to 2000° C. for sufficient time to produce a ceramic product.

10. The process of claim 9, wherein heating is by hot pressing at a temperature of 1700° C. to 2000° C. and pressure of about 20 MPa for about 1 to 3 hours to produce a fully dense ceramic product.

11. The process of claim 9, wherein heating is by firing in inert atmosphere or vacuum for about 1 to 3 hours.

12. The process of claim 9, wherein the powdered reactant Me is in the form of a diboride.

13. The process of claim 9, wherein the powdered reactant Ta is in the form of a diboride.

14. The process of claim 9, wherein the powdered reactants Me, Ta and B are in the elemental state.

15. An FeB iso-structural orthorhombic crystalline composition of matter characterized in zigzag chains of boron atoms in which the boron atoms are surrounded by seven metal atoms in the form of a mono-capped trigonal prism and consisting of the general formula:

$$Me_{0.5}Ta_{0.5}B,$$

wherein: Me is a metal selected from the group consisting of zirconium, hafnium and titanium; Ta is tantalum and B is boron, and characterized in a melting temperature exceeding 2300° C.

* * * * *